Sept. 25, 1956  C. H. O. BERG  2,764,252
ADSORPTION PROCESS AND APPARATUS
Filed March 18, 1952
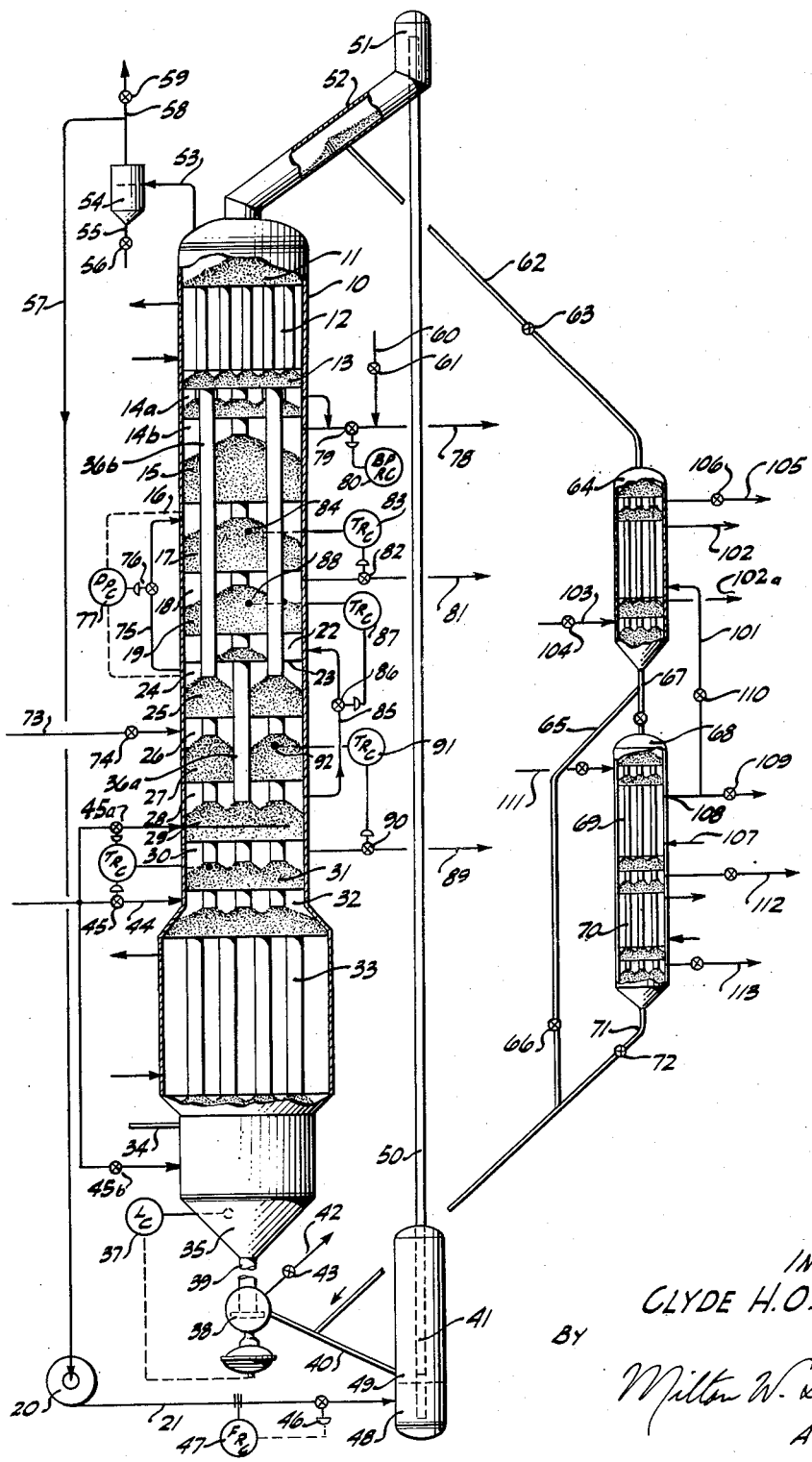
INVENTOR.
CLYDE H. O. BERG,
BY
Milton W. Lee
ATTORNEY.

# 2,764,252

ADSORPTION PROCESS AND APPARATUS

Clyde H. O. Berg, Long Beach, Calif., assignor to Union Oil Company of California, Los Angeles, Calif., a corporation of California Application March 18, 1952, Serial No. 277,256

18 Claims. (Cl. 183—4.2)

This invention relates to a process and apparatus for the continuous separation of normally gaseous mixtures by selective adsorption of certain constituents of such mixtures on solid granular adsorbents and further relates to a method of control of such a process. The invention applies particularly to the separation of said gaseous mixtures by selective adsorption on granular charcoal into a plurality of fractions including two heart cuts of extreme purity. This is a continuation-in-part of copending applications Serial No. 76,312, now U. S. Patent No. 2,603,306 and Serial No. 178,917, now U. S. Patent No. 2,692,656.

The separation of a light gaseous mixture into its constituent parts by the process of selective adsorption offers many advantages over the conventional separation processes of distillation, extraction, etc. In applying the processes of distillation or extraction to the separation of gaseous mixtures containing constituents of relatively low molecular weight, elevated pressures are required together with abnormally low temperatures to condense the gas into a liquid so that it may be separated by these processes. For example, in the preparation of pure ethylene by fractional distillation of ethylene-bearing stocks, a fractionator pressure of 385 pounds per square inch and a reflux temperature of −5° F. are required. In the preparation of pure methane by a similar process a pressure between 500 and 600 pounds per square inch and a reflux temperature of about −150° F. are required. The compression and refrigeration of light gaseous mixtures to permit separation by distillation or extraction are expensive operations and consequently large quantities of gaseous mixtures containing these and other light compounds are often wasted rather than to perform expensive recovery operations.

According to the present invention, the separation of gaseous mixtures by continuous selective adsorption on a granular solid adsorbent involves the steps of countercurrently contacting the gaseous mixture with a moving bed of the adsorbent thereby adsorbing from the mixture those constituents which are more readily adsorbable and leaving as a substantially unadsorbed gas those constituents which are less readily adsorbable. In a moving bed operation the adsorbent, upon which certain of the gaseous constituents have been adsorbed, flows from an adsorption zone into a stripping or desorption zone wherein the adsorbent is heated and contacted with a stripping gas, such as steam, for example, to cause the adsorbed constituents to be liberated. The adsorbent, freed of adsorbed constituents, is subsequently cooled prior to repassage through the adsorption zone. A gaseous mixture may be divided into two separate fractions consisting of a rich gas containing the more readily adsorbable constituents having the higher molecular weight or critical temperature and a lean gas containing the less readily adsorbable constituents having the lower molecular weight or critical temperature. The rich gas is obtained by adsorption and subsequent desorption of the more readily adsorbable constituents and the lean gas is obtained by removal from the adsorption zone of the less readily adsorbable constituents as a substantially unadsorbed gas.

It is to the improvement of the selective adsorption process, especially as applied to the separation of a given gaseous mixture into a plurality of fractions which includes at least one heart cut or intermediate fraction containing constituents of intermediate adsorbability, that this invention is directed.

It is an object of this invention to provide a selective adsorption process of improved efficiency and which has an increased inherent operation simplicity.

It is a further object of this invention to provide an improved selective adsorption process for the separation of low molecular weight hydrocarbon gases in which the separation of $C_1$ hydrocarbon from $C_2$ hydrocarbons is facilitated by the absence of $C_3$ hydrocarbons.

An additional object of this invention is to provide a process for the separation of $C_2$ hydrocarbons from $C_3$ hydrocarbons improved by the presence of $C_1$ hydrocarbon in the separation zone.

Another object is to provide improved stripping methods.

A still further object of this invention is to provide improved apparatus which is particularly adapted to accomplish the above-mentioned objects.

Other objects and advantages of this invention will become apparent to those skilled in the art as the description thereof proceeds.

Briefly, this invention comprises a process for the separation of gaseous mixtures which contain constituents having varying degrees of adsorbability with respect to a given granular solid adsorbent into a plurality of fractions or individual constituents thereof. The process of this invention comprises contacting the gaseous mixture with a moving bed of the solid granular adsorbent as herein more fully described in such a manner as to permit the production of a plurality of fractions of the gaseous mixture including at least one intermediate or heart cut fraction which contains constituents of the gaseous mixture of intermediate adsorbability. The process involves a continuous downward flow of a solid granular adsorbent through the column which contains a feed gas or primary separation section and a side cut gas or secondary separation section isolated from each other. The adsorbent flow is divided into two separate streams, one of which is passed into each of the above-mentioned zones and are subsequently combined. The gaseous mixture to be separated is introduced first into the feed gas zone wherein a partial separation is effected and subsequently one of the products from the feed gas section is passed into the side cut gas section wherein this is contacted with a separate stream of adsorbent. By this operating procedure, the gaseous mixture may be separated into at least three substantially pure fractions, each of which is uncontaminated by constituents normally present in the other fractions. In addition, this invention comprises a selective adsorption apparatus which is particularly adapted to accomplish the separation of normally gaseous mixtures into a plurality of fractions of extreme purity.

Briefly, the present invention comprises an improvement in the process of contacting a gaseous mixture to be separated with a moving bed of adsorbent in which the moving bed is divided into two separate contacting zones or sections in a single selective adsorption column. The selective adsorption column is provided at a point below the cooling zone with a secondary separation zone containing at least three contact zones and a primary separation zone containing at least two contact zones. The secondary separation zone is separated from the primary separation zone by a transverse divider across the column which prevents gas or solids flow therethrough except through tubes especially provided for the transfer of solids. One adsorbent stream flows from the cooler directly into the secondary separation zone while the second stream flows from the cooler through and independent of the secondary separation zone via conduits provided for this purpose. The first stream removed from the bottom of the secondary separation zone flows through and independent of the primary separation zone via conduits especially provided for this purpose. The two streams are combined immediately below the primary separation zone, and pass successively through a drying zone and a stripping zone. Thus each separation zone is provided with a separate stream of adsorbent from the cooler, each stream being passed through the other zone in heat transfer relationship therewith through conduits.

A gaseous mixture containing three principal constituents, for example, is introduced directly into the primary separation zone in which the most readily adsorbable constituent is adsorbed leaving the two less readily adsorbable constituents unadsorbed as a secondary feed gas. This gas is introduced from the primary separation zone into the secondary separation zone to be contacted by a separate stream of adsorbent and separated into its two constituents in substantially pure form. The most readily adsorbable constituent, adsorbed on the adsorbent in the primary separation zone, is desorbed in the stripping zone and a portion of it is passed through the drying zone into the bottom of the secondary separation zone wherein it is adsorbed, and thereby serves to desorb the fraction of intermediate adsorbability, which is removed as a side cut gas product. The adsorbed constituent passes with the adsorbent from the secondary separation zone through and independent of the primary separation zone through the drying zone and into the stripping zone. The adsorbent is heated by indirect heating and directly contacted by a stripping gas and the adsorbed constituents are thereby removed as the rich gas product. The lean hot adsorbent is conveyed from the bottom of the selective adsorption column to the top wherein it is passed through a tubular cooler. The cooled lean charcoal is then divided and passed through the two above-mentioned separation zones as described.

The present invention also comprises a process as particularly applied to the separation of gaseous mixtures containing predominantly hydrogen and normally gaseous hydrocarbons having about four carbon atoms per molecule or less. It has now been found that the separation of $C_3$ hydrocarbons from $C_2$ hydrocarbons on an activated charcoal adsorbent is facilitated by the presence of $C_1$ hydrocarbon in the zone of separation. It has also been found that the separation of $C_1$ hydrocarbon from $C_2$ hydrocarbons is deleteriously effected by the presence of $C_3$ hydrocarbons in the separation zone. The process of the present invention as briefly described above, as illustrated in the drawing and as hereinafter more fully described permits an improved separation of $C_1$, $C_2$ and $C_3$ hydrocarbons by causing these separations to take place in light of these findings. By eliminating the $C_3$ hydrocarbons from the zone of $C_1$-$C_2$ hydrocarbons separation, lower adsorbent rates per unit volume of gas separated result and less reflux or desorption gas is required to effect an equivalent desorption of a less readily adsorbable gas. It has been found that in the separation of hydrocarbon gases on activated coconut charcoal the reduction of carbon rate by practicing the findings of this invention approximates 10%, a material advantage when carbon circulation rates of the order of hundreds of tons per hour are employed.

In the above process, a portion of the intermediate fraction may be permitted to remain adsorbed on the adsorbent in the primary separation zone. This portion is then desorbed in the drying and/or stripping zone, so as to become part of the primary reflux from the drying zone to the side cut desorption zone at the bottom of the secondary separation zone. While the heavy fraction which is also contained in the primary reflux is adsorbed in the side cut desorption zone, the intermediate fraction will pass through unadsorbed and will be removed as part of the side cut gas. In fact, substantially all of the intermediate fraction may be treated in this manner, although it is preferable that at least part of the intermediate fraction be recovered as previously described, by passing unadsorbed through the primary adsorption zone, to be adsorbed in the secondary adsorption zone, and subsequently desorbed by the primary reflux gas in the side cut desorption zone.

The present invention may be more clearly understood by reference to the accompanying drawing which schematically shows a selective adsorption column improved to permit the separation of a gaseous mixture into three substantially pure fractions including a rectified intermediate or side cut fraction of very high purity.

Referring now more particularly to the drawing, selective adsorption column 10 is provided at successively lower levels therein with hopper 11, indirect cooler 12, adsorbent flow divider zone 13, lean gas disengaging zones 14a and 14b, secondary adsorption zone 15, secondary feed gas engaging zone 16, secondary rectification zone 17, side cut gas disengaging zone 18, tertiary rectification zone 19 which may be also termed the tertiary adsorption zone of the side cut desorption zone, primary reflux gas engaging zone 22, column divider 23, secondary feed disengaging zone 24, primary adsorption zone 25, feed gas engaging zone 26, primary rectification zone 27, primary reflux gas disengaging zone 28, drying or stripping gas adsorption zone 29, rich gas disengaging zone 30, preferential desorption or steaming zone 31, stripping gas engaging zone 32, indirect heating zone 33, solids feeder 34, and bottom zone 35. The secondary separation zone from which the lean gas and side cut gas products are removed and which may be termed a side cut gas zone includes zones 13 to 22, inclusive, and the primary separation zone or feed gas zone includes zones 24 to 28, inclusive. The solid adsorbent flows as a continuously moving bed or mass, unbroken from the level maintained in hopper 11 down to feeder 34. The moving stream is separated in zone 13 into two streams, one of which passes through the primary tubes 36b into the primary separation zone, while the other passes directly into the secondary separation zone. The separate streams of adsorbent removed from the secondary separation zone through secondary tubes 36a and directly from the primary separation zone are combined in primary reflux gas disengaging zone 28, and are passed as a single moving bed through drying zone 29 and stripping zones 31 and 32.

In bottom zone 35 an accumulation of adsorbent with a constant level is maintained by the cooperative action of level controller 37 and adsorbent flow control valve 38. The adsorbent passes from zone 35 through sealing leg 39 and from adsorbent flow control valve 38 via transfer line 40 into induction zone 41. The vent gas comprising a mixture of lift gas and stripping gas in removed from valve 38 via line 42 controlled by valve 43. This vent gas or seal gas prevents contamination of the rich gas product with lift gas or the contamination of the lift gas with stripping gas which is introduced via line 44 controlled by valve 45 into engaging zone 32. A lift gas is introduced under pressure exerted by lift gas blower 20 via line 21 controlled by valve 46 under the action of flow recorder controller 47 into lift gas inlet zone 48 of induction zone 41. The lift gas passes upwardly through solids inlet zone 49, picking up the adsorbent, forming a suspension and passes via lift line 50 into impactless separator 51. Herein the adsorbent suspension is broken and the adsorbent and lift gas pass as substantially independent phases through transfer line 52 to collect in the upper portion of column 10. The lift gas passes from column 10 via line 53 into separator 54 wherein suspended adsorbent fines are separated to be removed via line 55 controlled by valve 56. The fines-free lift gas then passes via lift gas return line 57 to the suction inlet of blower 20 for recirculation. Accumulations of lift gas in this cycle are withdrawn continuously via line 58 controlled by valve 59. If desired this gas may be combined with the lean gas product by means of line 60 controlled by valve 61.

A portion usually constituting about 1% to 20% of the recirculating adsorbent stream is removed from transfer line 52 at a point just upstream of the baffle shown and passed through one or both parts of the reactivation system where the deactivated adsorbent is subjected to a high temperature stripping operation and/or a higher temperature reactivation operation. In the preferred modification, spent or deactivated adsorbent is conveyed via transfer line and sealing leg 62 controlled by valve 63 into secondary stripping vessel 64. Herein the adsorbent passes downwardly through the desorbed product disengaging zone and subsequently through the tubes of the secondary heating zone. The granular adsorbent is heated and countercurrently contacted by a stripping gas such as steam introduced via line 103 at a rate controlled by valve 104 into the stripping gas engaging zone. The stripping gas passes countercurrent to the descending adsorbent, stripping desorbable constituents therefrom leaving a partially reactivated preheated adsorbent. This adsorbent is conveyed from the bottom of column 64 via line 67 and a portion thereof is bypassed via line 65 controlled by valve 66 around reactivator column 68 while the remaining portion is passed into the reactivator column via line 67 controlled by the valve shown. The absorbent thus introduced passes downwardly through the reactivation gas engaging zone into which a reactivation gas such as steam is introduced via line 111 at a rate controlled by the valve shown. The adsorbent passes downwardly through the tubes of reactivation zone 69 concurrently with the reactivation gas. Hot flue gases are introduced via line 107 at temperatures sufficient to heat the adsorbent to the reactivation temperatures. A portion thereof may be removed via line 108 controlled by valve 109 for recirculation to the flue gas generator or for venting to the atmosphere. The remaining portion is passed via line 101 controlled by valve 110 into the preheating zone of the secondary stripper 64.

The hot reactivated adsorbent and reactivation gases pass from reactivation zone 69 into the disengaging zone into cooling zone 70. If desired, a portion of the reactivation gases may be removed from the disengaging zone via line 112 controlled by the valve shown while the remainder passes concurrently with the adsorbent through cooling zone 70 and is removed through line 113. In the latter zone, the hot reactivated adsorbent is cooled to temperatures which do not damage mild steel materials of construction. The cooled reactivated adsorbent is then passed via line 71 controlled by valve 72 and combined with that portion passed directly from the stripping operation and is subsequently recirculated into the moving mass of granular adsorbent in the main column.

Although this is the preferred mode of operation, in some cases in which the feed gas is free from substantially undesorbable constituents, or constituents which are susceptible to polymerization to undesorbable constituents, the reactivator 68 may be dispensed with; and in other cases, where the ratio of difficulty desorbable constituents to substantially undesorbable constituents is low, the stripper 64 may be dispensed with. Obviously both may be dispensed with if the feed contains no such materials.

The description of the apparatus of this invention and the process involved in separating a gaseous mixture thereby into substantially pure fractions may be more readily understood from the following description which is in the form of a practical example. Although the example is directed to the separation of $C_1$ to $C_3$ hydrocarbon gases, the process is not to be considered as limited only to the separation of such gases since the description is merely an illustration of the operation whereby a rectified and substantially pure heart cut or side cut fraction is obtained.

Example

A selective adsorption column 9 feet 3 inches in inside diameter and designed according to the accompanying drawing utilizes a circulation of activated vegetable charcoal amounting to about 93,000 pounds per hour. The charcoal has a size range of 12 to 30 mesh. The charcoal circulation is divided into two streams at flow divider zone 13 and 75,000 pounds per hour pass directly into secondary adsorption zone 15 for passage through the secondary separation zone and the remaining 18,000 pounds per hour pass downwardly through and independent of the secondary separation zone through conduits 36b for introduction into primary adsorption zone 25 and subsequently through the primary separation zone.

The feed gas described below and containing $C_1$ to $C_3$ hydrocarbons is introduced at a temperature of about 150° F., and at a pressure of about 70 pounds per square inch gauge via line 73 at a rate controlled by valve 74 into feed gas engaging zone 26. It contacts the downwardly flowing activated carbon in primary adsorption zone 25 wherein all the $C_3$ and higher molecular weight hydrocarbons are adsorbed together with a small proportion of $C_2$ and perhaps some methane to form a rich charcoal. In primary adsorption zone 25 to $C_2$–$C_3$ separation is made in the presence of $C_1$ hydrocarbon which has been found to facilitate the separation by reducing the charcoal rate required. Most of the $C_2$ and less readily adsorbable constituents remains substantially unadsorbed and are removed from secondary feed disengaging zone 24 and passed via line 75 controlled by valve 76 into secondary feed engaging zone 16 in the secondary separation section.

Valve 76 controllng the rate of secondary feed introduction is actuated by differential pressure controller 77 to maintain a constant differential pressure between dsengaging zone 24 and engaging zone 16. The secondary feed, comprising most of the $C_2$ and substantially all of the $C_1$ and less readily adsorbable constituents but substantially no constituents more readily adsorbable than $C_2$, is countercurrently contacted by carbon in secondary adsorption zone 15. The $C_1$–$C_2$ hydrocarbon separation is effected here in the absence of the $C_3$ hydrocarbons since these were adsorbed and removed from the gas stream during passage through primary adsorption zone 25. The $C_2$ hydrocarbon fraction together with a small quantity of $C_1$ hydrocarbon is adsorbed in secondary adsorption zone 15 to form a second rich charcoal and the major proportion of hydrogen and $C_1$ hydrocarbon is substantially unadsorbed. This gas accumulates in lean gas disengaging zones 14a and 14b. The use of two disengaging zones instead of one at this point is advantageous in increasing the surface area from which the lean gas becomes disengaged from the adsorbent, and thereby reducing the tendency of the lean gas to entrain adsorbent. The lean gas product stream is removed from 14a and 14b via line 78 at a rate controlled by valve 79 which in turn is actuated by back pressure recorder controller 80, and is sent to storage or further processing facilities not shown.

A portion of the unadsorbed gas passes upwardly from lean gas disengaging zones 14a and 14b through the tubes of cooling zone 12, saturating the cooled lean adsorbent therein with constituents of the lean gas product and desorbing traces of stripping gas remaining adsorbed on the adsorbent. This gas flow is termed the "purge gas" and collects in the upper portion of selective adsorption column 10 to be combined with the recirculating lift gas. The combined purge gas and lift gas may be produced separately through line 58 as a product gas if desired, or it may be passed through lines 58 and 60 to be combined with the lean gas product.

The second rich charcoal formed in secondary adsorption zone 15 passes downwardly into secondary rectification zone 17. Herein the charcoal is contacted with a reflux gas comprising substantially pure $C_2$ hydrocarbons. A preferential desorption of adsorbed $C_1$ hydrocarbon results, the desorbed $C_1$ hydrocarbon passing upwardly to combine with the lean gas product and a second partially rectified charcoal substantially free of $C_1$ and less readily adsorbable constituents is formed. This charcoal passes downwardly into side cut desorption zone 19 wherein it is contacted by a countercurrent flow of primary reflux comprising $C_3$ hydrocarbons. The preferential desorption of $C_2$ hydrocarbons by the $C_3$ hydrocarbons is herein effected. Part of the $C_2$ hydrocarbons are employed as above described as the $C_2$ reflux in secondary rectification zone 17 and the rest are removed from side cut disengaging zone 18 via line 81 controlled by valve 82 in turn regulated by temperature recorder controller 83, which operates with thermocouple 84 in contact with the adsorbent in zone 17. The side cut gas product passes via line 81 to further processing facilities or storage not shown.

The charcoal in side cut desorption zone 19, from which the bulk of the $C_2$ hydrocarbons have been desorbed and which contains primarily $C_3$ and $C_4$ hydrocarbons together with some $C_2$, but is substantially uncontaminated by $C_1$ or less readily adsorbable constituents, passes downwardly through primary reflux engaging zone 22 and tubes 36a into drying zone 29. One portion of a primary reflux gas formed in zone 29 as hereinbelow more fully described, passes via line 85 at a rate controlled by valve 86 which is actuated by temperature recorder controller 87 operating in conjunction with thermocouple 88 in zone 19, and is introduced into primary reflux gas engaging zone 22. This gas passes upwardly countercurrent to the partially rectified charcoal present in side cut desorption zone 19 to preferentially desorb the $C_2$ constituents while adsorbing the $C_3$ hydrocarbon constituents as described above. The thus desorbed $C_2$'s together with the $C_2$'s present in the primary reflux gas, which pass unadsorbed through zone 19, are partially employed as the aforementioned $C_2$ reflux in secondary rectification zone 17 and the remainder is removed from side cut disengaging zone 18 via line 81 as previously described.

The rich charcoal present in primary adsorption zone 25 contains $C_3$ and higher molecular weight hydrocarbons together with a small proportion of $C_2$ and lighter constituents. It passes into primary rectification zone 27 wherein the charcoal is contacted by a countercurrent flow of a second portion of the aforementioned primary reflux gas formed in drying zone 29. Most of the $C_2$'s and all of the lighter constituents are preferentially desorbed in zone 27 to form a first partially rectified charcoal which is combined wth that removed from the bottom of the secondary separation zone in drying zone 29. Herein the partially rectified carbon is contacted with a countercurrent wet rich gas reflux containing principally $C_3$ hydrocarbons and stripping steam as described below. A preferential adsorption of substantially all of the stripping steam occurs, with or without adsorption of a portion of the $C_3$ hydrocarbons, thus forming a dry gas which contains $C_3$ and higher molecular weight constituents, and may also contain some $C_2$ hydrocarbons. This gas is the primary reflux gas which is employed as above described, and which must be dry, as explained below.

The rectified charcoal removed from the bottom of drying zone 29 passes into preferential desorption zone or steaming zone 31. Herein the rectified charcoal is contacted with a countercurrent flow of steam introduced through line 44. The bulk of the steam is preferentially adsorbed at the temperature of the carbon, causing an immediate desorption of the major proportion of the $C_3$ and $C_4$ hydrocarbon constituents. The desorbed gases and any other gases passing up through steaming zone 31 are in part passed through drying zone 29, while the remainder is removed via line 89 controlled by valve 90 which in turn is actuated by temperature recorder controller 91 operating in conjunction with thermocouple 92 in zone 27. The removed rich gas may be introduced into a cooler wherein the stripping steam is condensed if desired.

The charcoal saturated with stripping steam passes down through zone 32 into heater zone 33, in which it is heated to a temperature, such as about 500 to 600° F., at which substantially all of the remaining $C_3$ and $C_4$ hydrocarbons are desorbed, together with most of the steam. Most of this desorbed material passes back into zone 31, where part of the steam is adsorbed, as described above, while the unadsorbed material combines with the material desorbed in zone 31 and either passes out line 89 as part of the rich gas product, or passes into drying zone 29. A small amount of the material desorbed in heating zone 33, composed primarily of steam, passes concurrently with the charcoal in the lower part of heater 33, through the feeder 34, bottom zone 35 and sealing leg 39 and is withdrawn as part of the vent gas through line 42. The rest of the vent gas is composed of lift gas passing from induction zone 41 countercurrently to the charcoal in transfer line 40. This latter flow serves to remove any entrained steam from the charcoal.

The charcoal leaving zone 33 and recirculated through lift line 50 still has adsorbed on it small amounts of steam and $C_5$ and heavier hydrocarbons, which in general are more readily adsorbable than steam at the elevated temperature of the heater. The major proportion of this charcoal is recirculated directly to column 10, and the adsorbed steam is removed by the countercurrent flow of purge gas through the cooler 12 as previously described. The heavy hydrocarbons however remain on the charcoal circulated through column 10, and are recovered by by-passing a minor portion of the charcoal from transfer line 52 to high temperature stripper 64, which operates at a much higher temperature than heater 33, such as about 700 to 1100° F. The higher temperature is obtained by indirect heating with hot flue gas entering through line 101 and leaving through line 102. In high temperature stripper 64 the charcoal is contacted countercurrently with stripping steam introduced through line 103 and valve 104, and the mixture of desorbed $C_5$ and heavier hydrocarbons and steam is removed through line 105 and valve 106. The completely stripped charcoal may then be returned to the main circulating stream through line 65 or part or all of it may be passed through reactivator 68.

The charcoal gradually becomes deactivated by use as above, presumably due to accumulations of hydrocarbon or carbonaceous residua which are not desorbed by the high temperature stripping. This is particularly true where feed stocks containing unsaturated hydrocarbons are treated, and this indicates that much of this accumulation is due to polymerization of unsaturated hydrocarbons. For removing these residua and reactivating or restoring the activity of the charcoal, reactivator 68 is provided. In heater section 69 the charcoal is heated to a temperature of about 1200 to 1700° F. by means of hot flue gases entering through line 107 and leaving through line 108. Valves 109 and 110 are adjusted to permit some of the exhaust gas to be used in high temperature stripper 64 while the rest is withdrawn. If desired, a portion of the gases withdrawn through lines 102 and 108 may be recirculated to lines 101 and 107 respectively, with or without heating prior to recirculation.

Steam introduced through line 111 flows concurrently with the charcoal through reactivator 68, part of it being withdrawn through line 112 and part through line 113. The steam concentrations and temperatures maintained in heater 69 are sufficiently high to cause a reaction between the steam and the carbonaceous residua to form carbon monoxide and hydrogen. The latter are withdrawn with excess steam through lines 112 and 113. In cooler 70, the charcoal is indirectly cooled by a circulating heat transfer fluid, to a temperature not greatly in excess of that in heater 33, e. g. not greater than about 750° F., so that ordinary materials of construction such as mild steel may be used in the subsequent portions of the apparatus.

In the above example the approximate flow rates and the compositions in mol percent of the feed gas, the purge or elutriation gas, the lean gas, the side cut gas, and the rich gas are as follows:

|  | Feed | Purge | Lean | Side Cut | Rich |
|---|---|---|---|---|---|
| $CO+N_2$ | 4.2 | 5.9 | 4.2 | 1.1 | 2.1 |
| $CO_2$ | 0.2 |  |  | 1.8 | 1.0 |
| $H_2$ | 7.3 | 14.2 | 7.4 |  |  |
| $CH_4$ | 71.0 | 77.3 | 86.6 | 2.2 | 0.4 |
| $C_2H_4$ | 6.5 | 0.1 | 1.4 | 40.4 | 0.1 |
| $C_2H_6$ | 7.1 | 0.3 | 0.3 | 53.7 | 2.8 |
| $C_3H_6$ | 1.2 | 0.2 |  | 0.1 | 41.0 |
| $C_3H_8$ | 1.7 | 0.2 | 0.1 | 0.4 | 49.2 |
| $C_4H_8$ | 0.3 | 0.8 |  | 0.1 | 1.4 |
| $C_4H_{10}$ | 0.4 | 0.9 |  | 0.2 | 1.7 |
| $C_5H_{10}$ | 0.1 | 0.1 |  |  | 0.1 |
| $C_5H_{12}$+ |  |  |  |  | 0.2 |
| Flow Rate MSCF/Hr | 337 | 54 | 240 | 45 | 9.3 |

If the methane, carbon monoxide, nitrogen and hydrogen are grouped together as a less readily adsorbable or first fraction, the $C_2$ hydrocarbons and carbon dioxide are grouped together as the intermediate or second fraction, and the $C_3$ to $C_5$ hydrocarbons are grouped together as a more readily adsorbable or third fraction, the above data show that the feed contained about 82%, 14%, and 4% respectively of the constituents of the first, second and third fractions, and the purge gas-lean gas product was about 98% pure first fraction, the side cut was about 96% pure second fraction, and the rich gas was about 94% pure third fraction. In other words, on a $CO_2$-free basis, a feed gas containing about 13.6% $C_2$ hydrocarbons was processed at a rate of about 8 million cubic feet per day to recover a side cut containing over 92% of the $C_2$ fraction in a purity of 96%.

The recovery of hydrocarbons and decomposed hydrocarbons from the high temperature stripper and the reactivator, on a steam-free basis, amounted to less than 1% of the feed in the above case.

As previously indicated, the column employed in the above example had a uniform diameter of 9 feet 3 inches, the hopper or elutriation zone was approximately 14 feet in height, the cooler approximately 17 feet, the secondary adsorption zone approximately 11 feet, the secondary rectification zone approximately 8 feet, the side cut desorption zone approximately 14 feet, the primary adsorption zone approximately 11 feet, the primary rectification zone approximately 9 feet, the drying zone approximately 6 feet, the steaming zone approximately 7 feet, the heating zone 33 approximately 11 feet, the heating zone in the high temperature stripper approximately 18 feet, the heating zone in the reactivator approximately 10 feet, and the cooling section 70 approximately 8 feet. The maximum temperature in the stripper 33 was approximately 550° F., the maximum temperature in the high temperature stripper approximately 1000° F., the maximum temperature in the reactivator approximately 1500° F., and the minimum temperature at the bottom of cooler 70 approximately 800° F. The average temperature in the adsorption sections 15 and 25 was approximately 130° F.

There may be many modifications in the above process which may be made. Chief among these are modifications in the stripper arrangement. Thus it has been found advantageous to introduce the stripping steam above the rich gas disengager 30 instead of or in addition to below this disengager. For example, steam may be introduced into the lower portion of drying zone 29 through valve 45a and a spider just above the disengager 30 as shown. The rate of this introduction may be controlled as indicated by a temperature recorder controller operating this valve in accordance with the temperature at a point just below the tubes of disengager 30, as illustrated. The advantage of introduction above disengager 30 rather than below is that in the latter case the steam and rich gas which are employed as reflux in drying zone 29 must pass through tubes 30 countercurrent to the downflowing charcoal. In the modified method, in which the steam is introduced above the tubes, the steam so introduced will be selectively adsorbed and liberate rich gas reflux at this point. The remainder of the reflux not desorbed at this point, and the adsorbed steam or stripping gas, will pass downward through the tubes of disengager 30 concurrently with the adsorbent. Since the cross-sectional area of the disengager (within the tubes) is restricted, i. e. smaller than that of either zones 29 or 31, the circulation of adsorbent through the column may be limited by the rate at which the adsorbent can pass through this disengager 30, and this is frequently the case. The rate of solids flow through this disengager may clearly be considerably increased by employing a concurrent flow of gas or reducing the countercurrent flow, rather than employing entirely countercurrent flow as previously described. The increase in column capacity may be as great as 20% to 50%.

It is also to be understood that steam may be introduced not only above disengager 30 as through valve 45a, but may also be introduced below disengager 30 through valve 45; and if desired, additional steam may be introduced below the heater 33, either below the feeder 34 as through valve 45b, or between the feeder 34 and the heater 33. In fact, all of the steam may be introduced in any one of these three points, but it is preferable to introduce part of it at each of these points or at at least two of the points.

Another modification of this stripping operation involves introducing steam above disengager 30 and below heater 33 as through valves 45a and 45b, and withdrawing a portion of the steam and rich gas between disengager 30 and heater 33, as for example at disengager 32, as well as at disengager 30. In this case, the flow rate of the steam and rich gas both at this point and through line 89 may be controlled by valves such as 90 operating on a simple flow rate control.

In another modification, the system illustrated in U. S. Patent 2,545,850 may be employed for the stripping, in which large amounts of steam are passed through a section below the heating section, e. g. through 45b, and most of this steam, together with some rich gas, is removed thereabove, e. g. at a point just below heater 33, while the remainder passes up through heater 33. This system may be advantageously used in connection with the systems just described, in which a portion of the steam is introduced above disengager 30.

The system of U. S. Patent 2,545,850 may also be used in the high temperature stripper 64 as illustrated. Thus a steam outlet 102a may be provided above line 103 and below the heating tube section in the middle of the stripper. The bulk of the steam and desorbed gas may be removed through this lower outlet, while the remainder of the steam passes up through the heating tubes and is removed through line 105 as previously described.

Another modification of the reactivator 68 involves dispensing with the outlet 112 in the middle of the unit, and if desired, making the tubes continuous all the way from the header between lines 108 and 111 to the header between line 113 and the cooling air inlet. In this case the steam entering through line 111 travels concurrently with the adsorbent through both the heating and cooling sections and is removed through line 113. In this case it is usually desirable to employ two trays instead of one at approximately the position of line 113 so as to provide additional disengaging area. For this purpose a system such as illustrated by trays 14a and 14b may be employed, except of course it is unnecessary to divide the adsorbent into two separate streams here.

Vane feeders are generally employed in place of, or in addition to, valves 66 and 72 leading from the high temperature stripper and the reactivator, respectively.

These are used to control the rates of flow through the two units. In the above example 12,000 lbs./hour of adsorbent was passed through the high temperature stripper, and 9000 lbs./hour of this was by-passed through line 65, leaving only 3000 lbs./hour to pass through the reactivator. In some cases, in which there is little material desorbed in the high temperature reactivator 64, it may be dispensed with or by-passed by a line leading from line 62 directly into the top of reactivator 68.

Instead of employing a single tube lift line as illustrated, a multiple tube lift line as described in application Serial No. 18,913, now abandoned, may be employed, with slotted portions at the top of the lift line as illustrated in application Serial No. 47,966, now U. S. Patent No. 2,694,605. In the above example in fact 16 six-inch diameter tubes are used. The vertical portion of the impactless separator 51 may also be extended downward below the sloping transfer line 52 so as to form a pocket in which solid adsorbent will collect to form a bed upon which the adsorbent falls, rather than impinging on the bottom of line 52. The withdrawal line 62 may then be taken from the bottom of the vertical portion of the flow-reversing chamber 51, rather than from the bottom of line 52 as illustrated, and returned to the top of induction zone 41 rather than line 40 if desired.

If a multiple tube lift line is employed, as described in Serial No. 18,913, now abandoned, the flow of lift gas through line 21 may be controlled by means of one or a small number of the orifices in the induction zone below each tube of the multiple tube lift line rather than by an orifice in line 21 as illustrated. This avoids the necessity of passing all of the lift gas through an extra orifice.

Referring to the disengagers 14a and 14b, the flow rates of the gas from these disengagers may be controlled in a manner other than as illustrated. Thus, the gas from the upper disengager may be passed through a valve controlled by a ratio flow controller and introduced into line 78 beyond valve 79 rather than between valve 79 and the column as illustrated. The tubes 36b may end at the disengager plate of 14b rather than at the disengager plate of 14a as illustrated.

Column divider 23 may consist of two plates rather than one as illustrated, the downcomers 36b extending through both plates, while the downcomers 36a extend through the lower plate up to the upper plate.

The ratio of the adsorbent passing through the primary separation zone as compared with the secondary separation zone may be controlled by a splitting or flow controlling device as described in U. S. Patent 2,550,955, Figure 3. In the above example, four-fifths of the adsorbent was passed through the secondary separation zone, and only one-fifth through the primary separation zone. Bubble caps were used on the splitter, each cap consisting essentially of an open vertical tube through and extending above the top plate of the splitter, and a downwardly concave cap just above the top of the tube. This permits relatively free passage of gas from the disengaging zone 28 to primary rectification zone 27 without having to pass countercurrent to the charcoal through the downcomer tubes between these two zones.

As previously indicated, valve 90 on the rich gas outlet line may be controlled simply by a flow rate control valve. Temperature recorder controller 91 may then be used to control valve 86 so as to control the portion of primary reflux which passes through line 85, the remainder of the primary reflux gas produced in the drying zone 29 being passed up through the tubes or the bubble caps of disengaging zone 28. As previously indicated, it is of extreme importance that all of the stripping gas or steam be adsorbed in the drying zone 29, since the primary reflux gas must be substantially dry.

In addition to the modification previously described, in which stripping steam is introduced into drying zone 29 above disengager 30, other modifications may be made to reduce or eliminate the flow of gas countercurrent to the adsorbent in the downcomers of disengager 30. One such modification involves the use of bubble caps on the plate or tray of disengager 30 from which the downcomers depend. The use of such bubble caps by-passes the gas through them rather than through the downcomer tubes. In such case, however, the bubble caps must be properly designed, as for example with orifices sufficiently small to provide back pressure permitting the withdrawal of the proper amount of rich gas through line 89. Another such modification involves a by-pass of rich gas from line 89 back into drying zone 29 just above disengager 30, e. g. through valve 45a. This provides a readily controllable stream of reflux composed of both rich gas and steam flowing external to the column, and avoids passage of the reflux through the tubes of disengager 30 just as do the other modifications just mentioned. In both of the latter two modifications it is unnecessary that the steam be also introduced above the disengager, but such steam introduction at this point may be used if desired.

The feeder 34 may be of the type described in application Serial No. 230,609, now U. S. Patent No. 2,647,587, in which bent tubes are employed. This avoids the necessity of an enlargement of the column around heating zone 33, and permits the column to have a uniform diameter throughout its length.

As previously indicated, the hopper zone 11 may and should include an elutriation system, such as described in application Serial No. 640,979, now U. S. Patent No. 2,641,335 or application Serial No. 137,406, for example.

Although the invention has been specifically described above in terms of production of a single side cut gas, additional side cuts may be produced. For example, by employing the modification of Serial No. 76,312, now U. S. Patent No. 2,603,306, in which four sections are employed in the secondary separation zone rather than three, a very pure second side cut may be drawn from the lower-most section of the secondary separation zone. Also by modifying the primary separation zone below the feed point, so as to incorporate the features of either Figure 1 or Figure 2 of U. S. Patent 2,519,873, additional side cuts may be taken below the feed point.

It is also clear that although in the above specific example, hydrogen and $C_1$ to $C_4$ hydrocarbons were separated, the process and apparatus here described are useful for the separation of other mixtures of hydrocarbons or non-hydrocarbons. Thus gaseous mixtures containing hydrogen sulfide, carbon monoxide, carbon dioxide, rare gases such as helium, argon and the like, nitrogen, carbonyl sulfide, and the like may be separated into their constituent parts. The principles are also generally applicable to liquid mixtures of hydrocarbons or non-hydrocarbons. It is also clear that although activated charcoal is preferred and used in the above example, other selective adsorbents such as silica gel, alumina and the like may be used for the various separation processes described. As to the size of the adsorbent, granular adsorbent of about 10 to 40 mesh size was used in the above specific example, and this is the preferred size. However, it is clear that by appropriate design, other sizes of adsorbent may be employed, in some cases as large as 2 mesh and in other cases as small as 100 mesh or smaller.

In the above example pressures of approximately 70 lbs./sq. in. were used in the adsorption. While superatmospheric pressures are generally preferred, in some instances atmospheric or lower pressures may be employed.

To summarize therefore, the invention is directed particularly to the process and apparatus for separating fluid mixtures into fractions of different degrees of adsorbability on a solid adsorbent. The improved stripping methods are applicable to the production of two or more such fractions. The use of the drying section is particularly adapted to the preparation of three or more fractions. While the term "drying" is used herein to refer to the removal of steam as the stripping agent, it is clear that other stripping agents may be employed, and the drying section in such cases would be a stripping agent adsorption section. The term drying, however, is employed herein to designate any such stripping agent adsorption. Stripping agents other than steam which may be employed include higher molecular weight hydrocarbons, alcohols, glycols, halogenated hydrocarbons and, in fact, any material which is more readily adsorbable than the component of the feed gas to be desorbed at the temperature and pressure of the stripping zone, and which is readily separable from the adsorbent and from the various constituents of the feed gas which are being desorbed.

Other modifications of the invention which would occur to one skilled in the art are to be considered within the scope of the invention as defined in the following claims.

I claim:

1. A process for separating a fluid feed mixture into at least three fractions of different degrees of adsorbability on a solid absorbent which comprises permitting one portion of said adsorbent to flow downwardly as a continuous moving bed through a primary separation zone, permitting a second portion of said adsorbent to flow downwardly by gravity as a continuous moving bed through a secondary separation zone comprising a secondary adsorption zone and a side cut desorption zone successively, permitting said first portion and said second portion of solid adsorbent to commingle after passage through their respective separation zones and pass downwardly as a continuous moving bed through a drying zone, a disengaging zone of smaller cross-sectional area than said drying zone, and a stripping zone successively, countercurrently contacting said feed mixture with the first portion of adsorbent in the primary separation zone so as to adsorb a more readily adsorbable fraction while leaving unadsorbed a secondary feed mixture comprising a less readily adsorbable fraction and at least one fraction of intermediate adsorbability, countercurrently contacting said secondary feed mixture in said secondary adsorption zone with the second portion of adsorbent so as to adsorb said fraction of intermediate adsorbability while leaving unadsorbed said less readily adsorbable fraction, desorbing said fraction of intermediate adsorbability from the adsorbent in the side cut desorption zone by preferential adsorption of a primary reflux fraction withdrawn from the drying zone, introducing sufficient stripping agent into the lower portion of said drying zone to cause concurrent flow of gas and solids through said disengaging zone, removing said primary reflux fraction substantially free from stripping agent from the upper portion of said drying zone, subjecting the adsorbent to heating and contact with stripping agent in said stripping zone, and withdrawing from said secondary adsorption zone, said side cut desorption zone and said stripping zone respectively the less readily adsorbable fraction, the fraction of intermediate adsorbability, and the more readily adsorbable fraction.

2. In a process in which a fluid feed mixture is separated into fractions of different degrees of adsorbability on a solid adsorbent by selectively adsorbing a more readily adsorbable fraction while leaving unadsorbed a less readily adsorbable fraction, the adsorbent containing adsorbed thereon said more readily adsorbable fraction is permitted to pass downwardly by gravity as a solid moving bed successively through a drying zone of relatively unrestricted cross-sectional area in which the adsorbent is contacted with a refluxing agent comprising said more readily adsorbable fraction and a stripping agent, a disengaging zone of relatively restricted cross-sectional area, and a stripping zone of relatively unrestricted cross-sectional area in which said more readily adsorbable fraction is desorbed in the presence of a stripping agent, and one portion of said more readily adsorbable fraction desorbed in said stripping zone, admixed with stripping agent, is withdrawn from said stripping zone while a second portion thereof is passed upwardly from said stripping zone through the adsorbent passing downwardly through said disengaging zone into said drying zone to act as part of said refluxing agent, and the rate of flow of said adsorbent through said drying and stripping zones is limited by the rate at which said adsorbent can flow through said disengaging zone, the improvement which comprises introducing stripping agent unmixed with more readily adsorbable fraction into the lower portion of said drying zone above said disengaging zone to act as additional refluxing agent therein, and preferentially adsorbing substantially all of said stripping agent in said drying zone, thereby reducing the countercurrent flow of gas through said disengaging zone and increasing the rate at which the solids can flow therethrough.

3. A process according to claim 1 in which the stripping zone comprises a steaming zone and a heating zone, and the major portion of the adsorbent leaving the stripping zone is recirculated through a cooling zone directly to the first and second separation zones, while a minor proportion of the adsorbent is passed through an auxiliary stripping zone in which it is countercurrently contacted with stripping agent at a higher temperature than in the main stripping zone.

4. A process for the separation of a fluid feed mixture into at least three fractions of different degrees of adsorbability on a solid adsorbent, which comprises passing one portion of said adsorbent as a continuous moving bed downwardly by gravity through a primary separation zone, passing a second portion of said adsorbent as a continuous moving bed downwardly by gravity through a secondary separation zone comprising a secondary adsorption zone and a side cut desorption zone successively, combining the two portions of solid adsorbent and passing the combined adsorbent as a continuous moving bed downwardly by gravity through a drying zone, a disengaging zone of restricted cross-sectional area, and a stripping zone successively, countercurrently contacting said feed mixture with said adsorbent in the primary separation zone so as to adsorb a more readily adsorbable fraction while leaving unadsorbed a secondary feed mixture comprising a less readily adsorbable fraction and at least one fraction of intermediate adsorbability, countercurrently contacting said secondary feed mixture with solid adsorbent in the secondary adsorption zone so as to adsorb said fraction of intermediate adsorbability while leaving unadsorbed said less readily adsorbable fraction, countercurrently contacting the absorbent in the side cut desorption zone with a primary reflux fraction so as to desorb therefrom said fraction of intermediate adsorbability, countercurrently contacting the adsorbent in said stripping zone with a stripping agent at an elevated temperature so as to desorb therefrom a mixture of stripping agent and said more readily adsorbable fraction of the feed, withdrawing a portion of said mixture from said disengaging zone, passing the remainder of said mixture through said disengaging zone countercurrently to the adsorbent passing therethrough and into said drying zone so as to act as a portion of the refluxing agent therein, introducing stripping agent unmixed with more readily adsorbable fraction into the lower portion of said drying zone above said disengaging zone to act as additional refluxing agent therein, preferentially adsorbing substantially all of the stripping agent introduced into said drying zone, countercurrently contacting said adsorbent in the drying zone with said refluxing agent so as to produce said primary reflux fraction, passing said primary reflux fraction from said drying zone to said side cut desorption zone, and separately withdrawing from the secondary adsorption zone and the side cut desorption zone respectively said less readily adsorbable fraction and said fraction of intermediate adsorbability.

5. A process according to claim 2 in which the stripping zone comprises an upper steaming zone and a lower heating zone, indirect heating is employed only in the heating zone, and additional stripping agent is introduced below the heating zone so as to countercurrently contact the adsorbent in both the steaming zone and the heating zone.

6. A process according to claim 4 in which the rate of transfer of primary reflux gas from the drying zone to the side cut desorption zone is controlled in accordance with the temperature at a point in the primary separation zone.

7. A process according to claim 5 in which the flow of stripping agent into the drying zone is controlled in accordance with the temperature at a point in the steaming zone.

8. In an apparatus for the separation of a fluid feed mixture into fractions of different degrees of adsorbability on a solid adsorbent by selectively adsorbing a more readily adsorbable fraction while leaving unadsorbed a less readily adsorbable fraction, the improvement in the means for desorbing the adsorbed fraction which comprises means for desorbing the bulk of the adsorbed fraction from the adsorbent at a relatively low elevated temperature, means for cooling the major portion of the adsorbent prior to recirculating it to the process, means for segregating a minor portion of the adsorbent and passing it downwardly through a high temperature stripper comprising an upper indirect heating section and a lower steaming section, means for introducing stripping agent below said steaming section so as to pass countercurrently through the adsorbent therein in the absence of indirect heating, means for removing the bulk of the stripping agent from between said steaming section and said heating section means for indirectly heating the adsorbent in the upper section of said high temperature stripper while passing the remainder of said stripping agent countercurrently therethrough, and means for removing stripping agent and stripped adsorbed material from above the heating section.

9. A process according to claim 1 in which the stripping agent is steam.

10. A process according to claim 2 in which the stripping agent is steam.

11. A process according to claim 2 in which the adsorbent is activated charcoal.

12. A process according to claim 6 in which the adsorbent is activated charcoal.

13. A process according to claim 7 in which the adsorbent is activated charcoal.

14. A process according to claim 1 in which the feed mixture consists essentially of normally gaseous fractions.

15. A process according to claim 14 in which the feed mixture consists essentially of normally gaseous hydrocarbons.

16. A process according to claim 15 in which the three fractions of the feed comprise $C_1$, $C_2$ and $C_3$ hydrocarbons respectively.

17. A process according to claim 2 in which a portion of the stripping agent is removed from the adsorbent after passage through the stripping zone, so as to provide countercurrent flow of stripping gas through at least a portion of the stripping zone.

18. In an apparatus for separating a fluid feed mixture into fractions of different degrees of adsorbability on a solid adsorbent by selectively adsorbing a more readily adsorbable fraction while leaving unadsorbed a less readily adsorbable fraction, which comprises a drying section of relatively unrestricted cross-sectional area, a disengaging section which comprises tubes of relatively restricted cross-sectional area, and a stripping section of relatively unrestricted cross-sectional area means for permitting adsorbent containing adsorbed thereon said more readily adsorbable fraction to pass downwardly by gravity as a solid moving bed successively through said drying section, the tubes of said disengaging section, and the stripping section, the improvement which comprises means other than the tubes of said disengaging section for introducing stripping agent into the lower portion of said drying section, and means for removing stripping agent and said less readily adsorbable fraction at said disengaging section.

References Cited in the file of this patent
UNITED STATES PATENTS

| | | |
|---|---|---|
| 1,822,303 | Miller | Sept. 8, 1931 |
| 2,226,578 | Payne | Dec. 31, 1940 |
| 2,436,495 | Smith | Feb. 24, 1948 |
| 2,519,873 | Berg | Aug. 22, 1950 |
| 2,519,874 | Berg | Aug. 22, 1950 |
| 2,529,289 | Gilliland | Nov. 7, 1950 |
| 2,539,005 | Berg | Jan. 23, 1951 |
| 2,539,006 | Berg | Jan. 23, 1951 |
| 2,575,519 | Imhoff et al. | Nov. 20, 1951 |
| 2,575,520 | Berg | Nov. 20, 1951 |
| 2,590,322 | Imhoff et al. | Mar. 25, 1952 |
| 2,692,656 | Berg | Oct. 26, 1954 |

OTHER REFERENCES

"Hypersorption—New Fractionating Process;" by Berg and Bradley Petroleum Engineer, May 1947, pages 115 to 118.